March 1, 1927.

A. B. CUNNINGHAM 1,619,241

PEN LIFTER FOR RECORDING INSTRUMENTS

Filed June 21 1926

Inventor.
Arthur B. Cunningham
By Nissen & Crane
Attys.

Patented Mar. 1, 1927.

1,619,241

UNITED STATES PATENT OFFICE.

ARTHUR B. CUNNINGHAM, OF CHICAGO, ILLINOIS, ASSIGNOR TO REPUBLIC FLOW METERS CO., OF CHICAGO, ILLINOIS, A CORPORATION OF ILLINOIS.

PEN LIFTER FOR RECORDING INSTRUMENTS.

Application filed June 21, 1926. Serial No. 117,292.

This invention relates to a device for lifting the recording pen from a movable chart to facilitate removal and replacement of the chart.

The object of the invention is to provide a device of the class named which shall be of simple and improved construction, and automatic in its operation.

The invention is exemplified in the combination and arrangement of parts shown in the accompanying drawings and described in the following specification, and it is more particularly pointed out in the appended claims.

In the drawings:—

Figure 1:
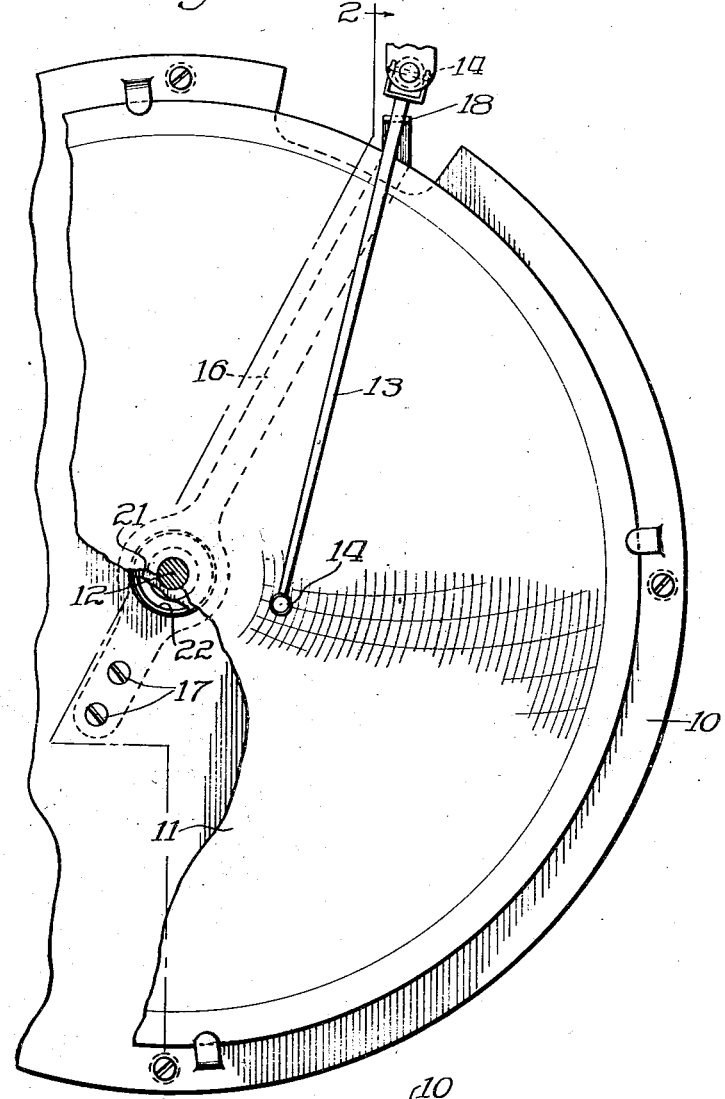
Fig. 1 is a fragmentary elevation showing a portion of the dial of a recording instrument having the present invention applied thereto.

The numeral 10 designates the stationary dial plate of a recording instrument, in front of which a recording chart 11 is mounted on a clock spindle 12. An indicator 13 is pivotally mounted at 14 on an instrument spindle 15. The spindle 15 may be connected with any form of instrument such as an electric meter, a $CO_2$ recorder, flow meter, or other measuring device. The lower end of the indicator 13 carries a tracing pen 14 which bears against the chart 11 and traces a line on the chart as the chart is rotated by the spindle 12.

Further explanation of the mechanism thus far described is unnecessary as mechanism of this nature is well known in the art.

Figure 2:
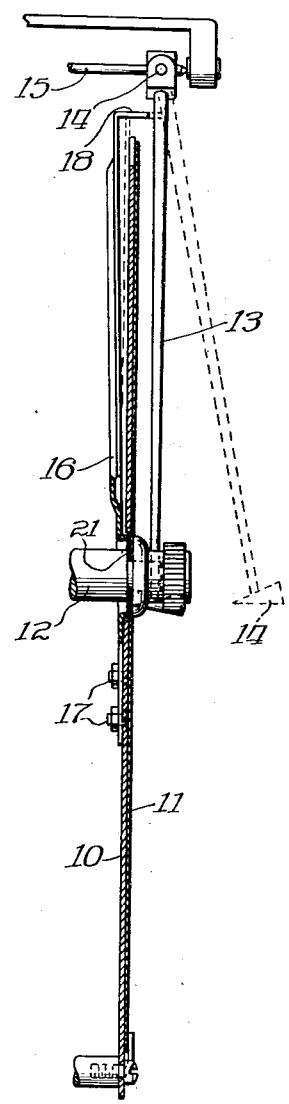
Fig. 2 is a section on line 2—2 of Fig. 1.

The spindle 12 projects through an opening in the dial 10, the opening being somewhat larger than the spindle. A spring arm 16 is secured to the rear face of the dial 10 by screws 17 or other suitable fastening means. The end of the arm 16 carries a contact flange 18 disposed in the rear of the upper end of the indicator 13 and in position to engage the indicator 13 and swing it into broken line position shown in Fig. 2. The spring tension in the arm 16 normally presses the arm against the rear of the dial 10 so that the indicator will be moved to the broken line position.

The spindle 12 carries a threaded reduced portion 19 which receives a nut 20. The chart 11 is provided with an opening through which the reduced portion 19 extends and the chart is clamped in place by the nut 20. A washer 21 may be placed over the reduced portion 19 in the rear of the nut 20 to form a backing for the chart 11. The spring arm 16 is enlarged adjacent the spindle 12 and is provided with an opening surrounding the spindle. The edge of the opening in the arm 16 is bent over to form a flange 22 which projects forwardly through the opening in the dial 10 when the spring arm is in contact with the rear face of the dial. When the nut 20 is screwed down upon the spindle 12, however, the washer 21 will be forced against the edge of the flange 22 and force the flange back into the position shown in Fig. 3. This will spring the arm 16 away from the rear face of the dial 10 so that the flange 18 will be withdrawn from contact with the indiator 13 and the pen 14 will be permitted to swing by gravity against the face of the chart 11.

Now, when it is desired to replace a chart 11 by a new chart, the nut 20 must first be removed to release the old chart. As soon as the nut 20 is released, the spring arm 16 will move forwardly and the flange 22 will project through the opening in the dial 10. This will permit the flange 18 to swing the pen 14 away from the chart. In this way, the pen is automatically lifted upon removal of the nut 20 so that when the chart is removed there is no danger of the pen making an extra line or mark on the face of the chart.

Figure 3:
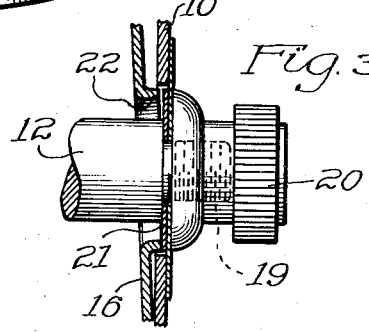
Fig. 3 is an enlarged section showing the connection between the pen lifter and the support for the chart.

When a new chart is placed in position on the spindle 12 and the nut 20 screwed down, the flange 22 will again be forced rearwardly into the position shown in Fig. 3 whereupon the flange 18 is withdrawn from the indicator and the pen automatically returned to position in contact with the newly installed chart.

I claim:—

1. In a recording instrument having a recording pen and a support for a chart, means for securing a chart on said support, and means controlled by said chart securing means for shifting the position of said pen.

2. In a recording instrument having a rotary chart support and a pen for tracing a line on a chart carried by said support, means for securing a chart in place on said support, and means, rendered inoperative by said chart securing means, for holding said pen out of operative relation with a chart on said support.

3. In a recording instrument having a chart support and a tracing pen, means for securing a chart in position on said support, and means for lifting said pen away from said chart when said chart securing means is released.

4. In a recording instrument having a chart support and a recording pen, a spring actuated member for holding said pen out of operative position, and means for securing a chart on said support, said chart securing means operating to release said pen from said spring actuated member when said chart securing means is operated to secure a chart on said support.

5. In a recording instrument having a chart support and a recording pen, means for securing a chart to said support, and a spring arm arranged to engage said pen to hold said pen out of operative position, said spring arm having a contact portion disposed in the path of said chart securing means to be operated thereby for releasing said pen when said chart securing means is moved to operative position.

6. A recording instrument comprising a rotary spindle, a recording pen, a threaded member for securing a chart to said spindle, and means controlled by said threaded member for moving said pen out of operative position when said threaded member is released from said spindle and for permitting return of said pen to operative position when said threaded member is in position to secure a chart to said spindle.

7. In a recording instrument, a dial having an opening therethrough, a spindle positioned in said opening, a threaded member for securing a chart to said spindle, and a pen lifter having a contact member registering with the opening in said dial in position to be operated by said threaded member for releasing said pen lifter.

8. In a registering instrument, a stationary dial having an opening therethrough, a spindle projecting through said opening, a threaded member for securing a chart on said spindle, a pen for cooperating with said chart, and a spring arm secured to the rear face of said dial and having means thereon for engaging said pen for lifting said pen away from said chart, said arm having a contact member registering with the opening in said dial to enable said threaded member to move said spring arm away from said pen when a chart is secured to said spindle.

9. A recording instrument comprising a stationary dial, a spindle projecting through said dial, a threaded member for securing a chart on said spindle, a tracing pen for cooperating with a chart on said spindle, a spring arm secured to the rear of said dial and having a flange thereon surrounding said spindle and registering with the opening in said dial, and a contact member on said arm for engaging said pen to lift said pen from said chart, said arm being forced rearwardly to move said contact member away from said pen by pressure exerted on said flange by said threaded member when a chart is secured to said spindle by said threaded member.

10. In a recording instrument, a stationary dial having a central opening, a rotary spindle projecting through said opening, a threaded member for securing a chart to said spindle, an indicator pivotally mounted adjacent the periphery of said dial and arranged to trace a line on a chart on said spindle, and a spring arm for holding said indicator away from said chart, said arm having a contact member thereon disposed in the path of said threaded member for releasing said spring arm when a chart is secured thereby to said spindle.

In testimony whereof I have signed my name to this specification on this 18th day of June, A. D. 1926.

ARTHUR B. CUNNINGHAM.